United States Patent [19]

Moran

[11] 4,033,535
[45] July 5, 1977

[54] STRAIN-RELIEF BUSHING
[75] Inventor: Thomas M. Moran, Cleveland, Ohio
[73] Assignee: Eaton Corporation, Cleveland, Ohio
[22] Filed: May 18, 1973
[21] Appl. No.: 361,737
[52] U.S. Cl. .............. 248/56; 174/153 G; 339/103 B
[51] Int. Cl.² .......................................... F16L 5/00
[58] Field of Search ............... 248/56, 73, 74 PB; 174/153 G, 152 G, 65 G; 339/103 R, 103 B, 103 C, 107, 128; 285/158

[56] References Cited
UNITED STATES PATENTS

| 885,017 | 4/1908 | Cassidy | 174/152 G X |
|---|---|---|---|
| 2,147,239 | 2/1939 | Buchanan | 285/158 X |
| 2,592,130 | 4/1952 | Erb et al. | 174/153 G X |
| 2,664,458 | 12/1953 | Rapata | 174/153 G |
| 3,056,852 | 10/1962 | Sachs | 174/153 G |
| 3,079,581 | 2/1963 | Klumpp | 174/153 G X |
| 3,272,913 | 9/1966 | Crimmins et al. | 339/107 X |
| 3,434,746 | 3/1969 | Watts | 248/56 X |
| 3,502,917 | 3/1970 | Bizoe | 174/153 G X |
| 3,689,014 | 9/1972 | Fink | 248/56 |
| 3,721,939 | 3/1973 | Paugh | 339/103 R X |

FOREIGN PATENTS OR APPLICATIONS 663,297  5/1963  Canada .................. 285/158

Primary Examiner—Roy D. Frazier
Assistant Examiner—Rodney H. Bonck
Attorney, Agent, or Firm—Teagno & Toddy

[57] ABSTRACT

A unitary, permanently-locked, strain-relief bushing and a tool for applying same in an aperture in a support panel. The bushing comprises two generally concave, complementary portions interconnected by a flexible web. Each complementary portion comprises a shank segment having an especially configured shouldered end and a grip segment frangibly secured thereto axially extending from the shouldered end.

The tool for applying the bushing into the aperture comprises an open-sided barrel, a plunger within the barrel and an especially configured mounting recess at the front end of the barrel. The mounting recess firmly receives the shank shouldered ends when the complementary portions are folded, concave portion to concave portion permitting an electric conductor or the like to be received in the bore thus defined by the complementary portions. The shank segments are inserted into the aperture whereupon the plunger is actuated to contact the front end of the grip segments and sever the grip segments from the shank segments. Further travel of the plunger forces the grip segments within the shank segments and permanently locks the conductor within the bushing and the bushing within the support panel.

2 Claims, 9 Drawing Figures

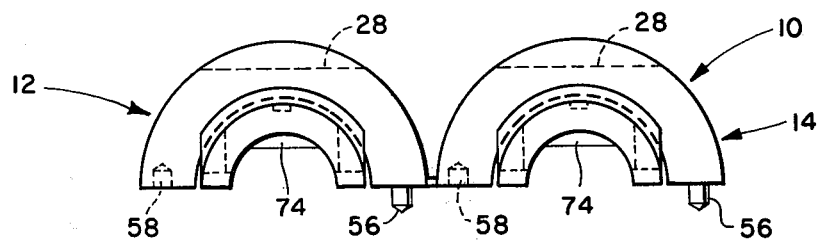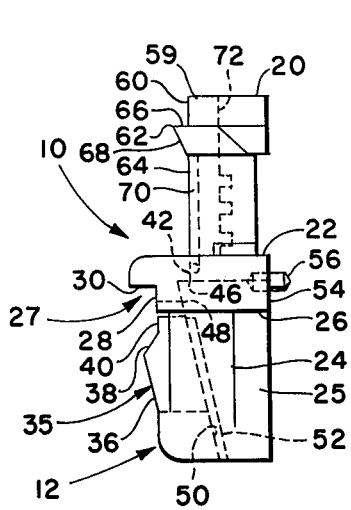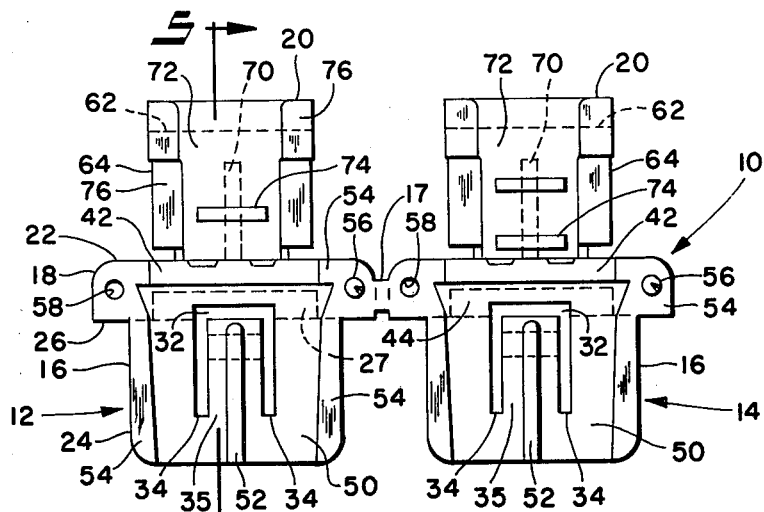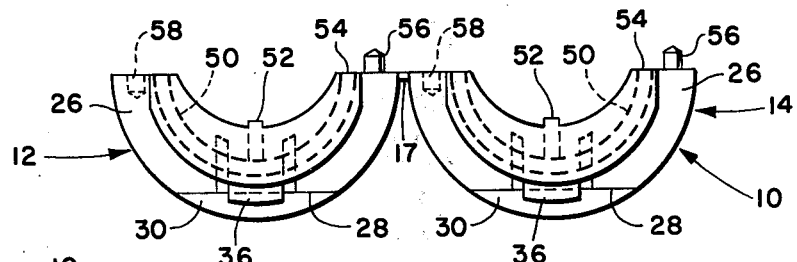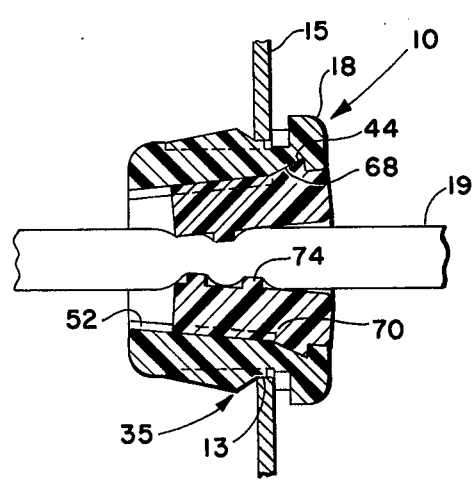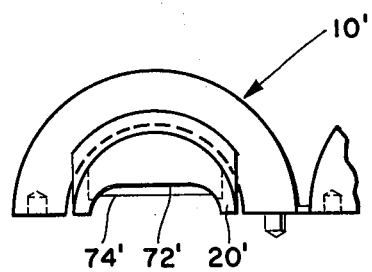

STRAIN-RELIEF BUSHING

This invention relates generally to strain-relief bushings and more particularly to a one-piece, molded, permanently-mounted, strain-relief bushing and tool for applying same.

The invention is particularly applicable to a strain-relief bushing for use with an electrical conductor, either flat or round, and to a tool for applying the bushing into an aperture in a support panel and will be described with particular reference thereto. However it will be appreciated by those skilled in the art that the invention may have broader applications and may be used as a fastener for securing such items as cables, hoses, and the like which must pass through openings in various structures.

One-piece, molded strain-relief bushings are known in the art. Heretofore such bushings comprised an essentially, semi-cylindrical base portion which received a conductor extending therethrough and a locking portion secured to the base portion by a flexible web. The locking portion fits into an especially configured recess within the base portion and had to be securely held therein by an especially formed pair of pliers while simultaneously being forced into the aperture in the support panel. This cumbersome assembly method was further complicated by the flexible web which could "hang up" on the edge of the aperture while the bushing was being jostled into position.

Furthermore, when prior art bushings were assembled into the support panel's aperture, the frictional locking engagement between bushing and conductor occurred primarily at the edge of aperture. Thus the conductor was frictionally secured within the bushing solely by a limited line loading about the aperture. Because the loading was confined to a limited surface the conductor must be locked tighter than what otherwise might be possible and accordingly the distortion of the conductor resulting from such concentrated loading is somewhat greater than what is otherwise possible.

It is thus an object of the subject invention to provide a permanently-lockable, strain-relief bushing and a tool for applying same which results in easy assembly of the bushing into an aperture in a support panel.

In accordance with the invention this object is achieved by providing a one-piece, molded bushing comprising first and second generally concave complementary portions. Each complementary portion is defined by a shank segment having an especially configured shouldered end and a grip block molded segment frangibly secured to the shouldered end. The grip blocks are thus adapted to be severed from and received within the shank segments whereby the conductor becomes permanently locked within the shank segments.

This locking action is achieved by forming the interior surface of each shank segment into an especially formed recess in the shouldered end with an inwardly-tapered, cylindrical surface depending therefrom. Accordingly, the exterior surface of each grip block segment includes a flange protruding from the top end thereof and a generally straight cylindrical surface depending from the flange. When the bushing is in a permanently-locked, assembled position, the flanges of each grip block fit within the shank segments' recess and the generally straight cylindrical surfaces of the grip blocks abut the tapered surfaces of the shank segments to cam the grip blocks into frictional engagement with the conductor adapted to be extended through the bushing. In this manner, the conductor is frictionally engaged along the length of the bushing.

In accordance with another feature of the invention a tool is provided for mounting the bushing in an assembled position within the support panel's aperture. The tool comprises an open-sided, hollowed cylindrical barrel having an especially configured mounting recess in its nose end and a plunger slidably mounted within the barrel. The mounting recess is adapted to receive and firmly engage the shouldered ends of the shank segments when the complementary portions are folded into face-to-face relationship in a preassembled position (the conductor extending through the bore thus formed in the complementary portions). The shank segments are then inserted into the aperture and more are removably retained therein, at this time, by depressible cammed projections formed in each shank segment's cylindrical surface. Actuation of the plunger by suitable means forces the plunger to push the grip blocks into the shank segments to thus frictionally engage the conductor within the bushing as explained above.

It is thus another object of the subject invention to provide a strain-relief bushing having improved frictional characteristics which do not excessively deform or distort the electrical conductor secured therein.

It is another object of the invention to provide a tool which permits an easier and faster method of mounting a strain-relief bushing in gripping engagement with an electrical conductor in an aperture of a support panel.

It is another object of the invention to provide a strain-relief bushing in combination with a tool for applying same which permits the bushing when applied to the tool in a preassembled position to frictionally engage a conductor to be secured therein whereby the position of the conductor within the bushing can be accurately predetermined prior to mounting the bushing in an aperture in a support panel.

Yet another object of the invention is to provide a strain-relief bushing in combination with a tool for applying same which permits the bushing to be applied in a removable manner to an aperture in a support panel when the bushing is in a preassembled position and yet permanently locks the bushing within the aperture when the bushing is in an assembled position.

The invention may take physical form in certain parts and arrangement of parts, a preferred embodiment of which will be described in detail herein and illustrated in the accompanying drawings which form a part hereof and wherein:

FIG. 1 is a front elevation view of the strain-relief bushing of the subject invention;

FIG. 2 is a top view of the strain-relief bushing;

FIG. 3 is a bottom view of the strain-relief bushing;

FIG. 4 is a side view of the strain-relief bushing;

FIG. 5 is a sectioned view of the strain-relief bushing taken generally along Line 5—5 of FIG. 1 when mounted in an aperture of a support panel and frictionally engaging a conductor extending therein;

FIG. 9 is a partial top elevation view of a modification to a strain-relief bushing of the subject invention.

Figure 7:
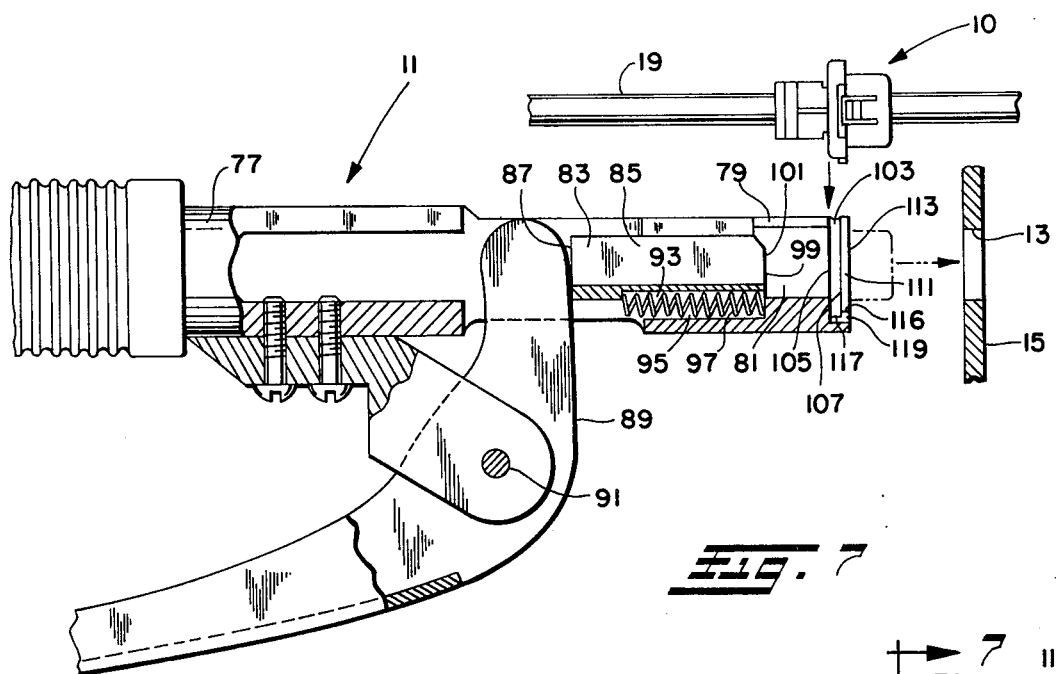
FIG. 7 is a sectioned view of the tool taken along Line 7—7 of FIG. 6.

Referring now to the drawings wherein the showings are for the purpose of illustrating a preferred embodiment of the invention only and not for the purpose of limiting the same there is shown in FIGS. 1 through 4 a unitary, permanently-locked, strain-relief bushing 10 of the subject invention. Strain-relief bushing 10 is adapted to be applied by means of a tool 11 (FIGS. 6 and 7) to an aperture 13, in a support panel 15 (FIG. 8) for permanently securing a conductor 19 therein (FIG. 5).

Strain-relief bushing 10 may be viewed as having a first molded position (FIGS. 1 through 4), a second preassembled position (FIG. 7) and a third assembled position (FIG. 5) and may best be described by detailed referece to its structure in the first, as molded, position. The strain-relief bushing 10 as thus shown in FIGS. 1 through 4 comprises first and second generally concave complementary portions 12, 14 joined together by a flexible web 17. Complementary portions 12, 14 are essentially similar and description of complementary portion 12 will likewise be applicable to complementary portion 14 except where noted. Complementary portion 12 includes a shank segment 16 having an especially configured shouldered end 18 and a grip block segment 20 frangibly secured to shouldered end 18.

Figure 8:
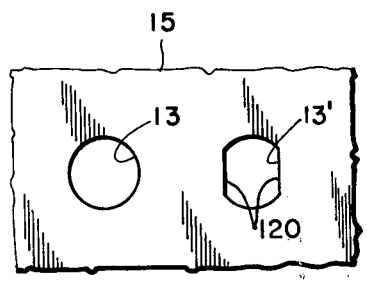
FIG. 8 illustrates alternate hole arrangements in a support panel for receiving the strain-relief bushing of the subject invention.

The external configuration of shank segment 16 is defined by a top end 22, the shouldered end 18 extending downwardly from the top end 22 and a cylindrical bottom surface 24 depending from a base 26 of shouldered end 18. Cylindrical bottom surface 24 is essentially semi-circular and has flat, diametrically-opposed sides 25 (FIG. 4) for non-rotatable application of the bushing 10 in an especially-configured aperture 13' (FIG. 8). Cut into the bottom portion of shouldered end 18 is a right angle recess 27 defined by a first vertically-extending flat surface 28 and a second horizontally-extending flat surface 30 whereby bushing 10 is adapted to be mounted into tool 11 (FIG. 7). Within the bottom portion of first flat surface 28 is a transversely-extending slot 32 intersecting at its ends with vertically-extending slots 34 in bottom surface 24 to define an opening into which is received depressible cammed projection means 35 for retaining shank segments 16 within aperture 13 (FIG. 5). Cammed projection means 35 includes a formed first outwardly tapering projection 36 extending from cylindrical surface 24 adjacent and between the bottom of vertically-extending slots 34. Projection 36 forms an apex with a second inwardly tapering projection 38 which in turn blends into a leading edge surface 40 adjacent transversely extending slot 32 (FIG. 4).

The interior configuration of shank segment 16 includes a semi-circular annular rib 42 at the top end 22 and a tapering recess 44 depending from the bottom of annular rib 42. Tapering recess 44 includes a flat seating surface 46 at right angles to rib 42 which in turn is contiguous with a frusto-conical surface 48 extending from the inner edge of flat surface 46. Extending downwardly from the inner diameter of frusto-conical surface 48 is a tapered cylindrical surface 50 having a gradually decreasing radius in a downward direction which alternatively may be viewed either as a frusto-conical surface or a sphero-conical surface. Extending outwardly from the middle of tapered cylindrical surface 50 and running the length of surface 50 is a locking rib 52.

As thus defined, the generally cylindrical exterior surface of shank segment 16 encircles the interior surface and becomes contiguous therewith at the sides of the shank segment by generally flat, side face surfaces 54. Extending from one side face 54 adjacent shouldered portion 18 is a dowel 56 and a similarly sized aperture 58 extends within the other side face of the shank segment; the dowel 56 and aperture 58 of one complementary portion 12 being oppositely arranged from that of the other complementary portion 14 so that when shank segments 16 are folded into face-to-face relationship the dowel 56 in one shank segment will be received by the aperture 58 in the other shank segment.

Referring now to the grip block segment of complementary portions 12, 14, it will be observed from FIG. 4 that grip block 20 is frangibly secured to the annular rib surface 42 of the shank segment to assure that grip block segment 20 will be disposed within the interior surface of shank segment 16 when the frangible connection therebetween is severed.

The exterior surface of grip block segment 20 is defined by a semi-circular top end 59, a semi-cylindrical surface 60 extending downwardly from the top end 59, and especially configured shoulder 62 protruding outwardly from semi-cylindrical surface 60 and a generally semi-cylindrical surface 64 depending from the bottom of shoulder 62. More particularly shoulder 62 is defined by a generally flat, semi-circular locking surface 66 protruding outwardly from semi-cylindrical surface 60 at right angles thereto and a frusto-conical surface 68 extending at its major diameter from the outer edge of locking surface 66 and intersecting generally semi-cylindrical surface 64 at its minor diameter (FIG. 4). Positioned in the middle of generally semi-cylindrical surface 64 is a vertically-extending locking rib recess 70.

The interior surface 72 of grip block segment 20 is shown as essentially semi-cylindrical in configuration with at least one finger protrusion 74 extending therefrom. The opposing grip block segment 20 is shown with two finger protrusions 74 axially spaced so that the first mentioned finger falls midway between the second mentioned fingers when the complementary portions 12, 14 are folded into face-to-face relationship (FIG. 5). Because the interior surface 72 is semi-cylindrical, the strain-relief bushing 10 shown in FIGS. 1 through 4 is suitable for use with a round electrical conductor. The bushing 10' shown in FIG. 9 (like numbers designated by a prime (') indicate like surfaces) is suitable for use with a flat electrical conductor. Bushing 10' thus shown is identical to bushing 10 of FIGS. 1 through 4 except that interior surface 72' is shown flat.

Like the shank segments, the interior and exterior surfaces of the grip block segment 20 are contiguous with one another by generally flat side faces 76. Importantly each side face 76 is stepped and projects further inwardly over the top portion of the grip block in the area of surfaces 60, 62 than it does over the portion to facilitate insertion of grip block segments 20 into tapered cylindrical surface 50 as will be explained hereafter in greater detail.

Figure 6:
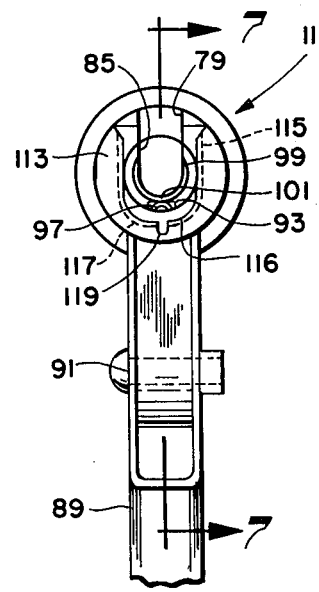
FIG. 6 is an end elevation view of a tool for mounting the strain-relief bushing of the subject invention in an opening in a support panel.

Referring now to FIGS. 6 and 7, there is shown a tool 11 for applying strain-relief bushing 10 into an aperture 13 in a support panel 15. The tool comprises a barrel 77 having a longitudinally-extending opening 79 along its top portion and a generally semi-cylindrical interior surface 81 at the bottom thereof. Disposed within the barrel 77 is a hollow cylindrical plunger 83 which is likewise shown as having a longitudinally-extending opening 85 along its top portion. The rear end 87 of plunger 83, which is flat, abuts against an actuating lever 89 which is shown pivoted at 91 to produce a mechanical force advantage against the plunger in a known manner. A groove 93 in the bottom of plunger 83 coacts with a groove 95 in the bottom of semi-cylindrical surface 81 to form a recess which carries a spring 97 to produce spring biasing means normally maintaining the plunger 83 in a retracted position and the lever arm 89 in an actuated position as shown in FIG. 8. The front end 99 of plunger 83 is shown chamfered and ground flat to produce a circular front edge bearing surface 101.

An especially-configured mounting recess 103 is provided in the forward end of barrel 77. The especially configured mounting recess 103 is more particularly defined as having a rearward retaining lip surface 105 which intersects with the interior surface 81 of barrel 77 and which is spaced from a similarly shaped forward retaining lip surface 107. The forward retaining lip surface 107 in turn intersects with an edge surface 111 which in turn terminates at the outermost end of barrel 77 defined as a flat nose surface 113. The rearward and forward retaining lip surfaces 105, 107 are each defined as having two vertically-extending side portions 115 which respectively blend into curvilinear portions 117, 116 at the bottom of barrel 77. The vertically-extending side portions 115 for the forward retaining lip surface 107 extend downwardly further than those for the rearward retaining lip surface 105 and thus curvilinear portion 117 at the bottom of edge surface 111 is depressed from the curvilinear portion 116 of forward retaining lip surface 107. The dimensions of the mounting recess 103 are such that the distance from the rearward retaining lip surface 107 to the nose surface 113 approximately equals the axial distance of the shank segments' shouldered ends 18. The width of the mounting recess 103 defined as the distance between the forward and rearward retaining lip surfaces 107, 105 approximates the axial distance of the shank segment's right angle recess 27 in the shouldered ends 18.

As thus described, the position of the strain-relief bushing 10 in its preassembled and assembled positions in conjunction with the use of tool 11 will now be described with reference to FIGS. 5 and 7. An electrical conductor 19 is placed in contact with the interior surfaces of one of the complementary portions 12 so as to axially-extend therealong. The other complementary portion 14 is then folded into face-to-face relationship with the first complementary portion; the shank segments 16 being axially aligned with one another by dowel pins 56 received within their respective apertures 58. The bushing is now in its preassembled position (FIG. 7) whereby the complementary portions 12, 14 define an axially-extending, cylindrically-stepped bore having a smallest diameter defined by the interior surface 72 of the grip block segments 20. Importantly this diameter is so sized that the conductor 19 is frictionally engaged therein and thus the position of the conductor relative the bushing 10 can be predetermined prior to mounting same in the support panel 15.

Bushing 10, in its preassembled position, is then applied to tool 11 by mounting shouldered ends 18 into the tool's mounting recess 103 so that the shank segments' bottom surfaces 24 extend from the nose 113 of the tool. To assure that bushing 10 seats in the bottom of recess 103, a groove 119 is provided in the bottom thereof to receive web 17 in the event bushing 10 is applied to recess 103 with the web 17 facing downwardly. With the bushing 10 in the tool 11, it should be noted that the plane of shank segments' side faces 54 lies parallel to the vertically-extending side portions 115 of the mounting recess so that the complementary portions 12, 14 cannot spread apart when the bushing is within the tool.

In this position the tool is held by the handle and the bottom surface 24 of the shank segment 16 is pushed into the aperture 13 of a support panel 15 until the base 26 of the shouldered end 18 contacts the support panel; the cammed projections 36, 38 snapping outwardly to retain shank segment 16 within the aperture 13. Importantly, if it is desired to remove the bushing 10 from the aperture 15 at this point, the cammed projections 36, 38 can be depressed by suitable means not shown and the bushing 10 removed from the aperture.

The tool operator now depresses acuating lever 89 to move plunger 83 forward in barrel 77 from its normally retracted position. The front edge bearing surface 101 of the plunger 83 thus contacts the top end 59 surfaces of the grip block segments 20 which, importantly, are prevented from moving out of contact with bearing surface 101 by the sides of the barrel 77. The plunger 83 then pushes the grip block segments 20 into the position shown in FIG. 5, the plunger having a maximum travel in its fully actuated position which places the front edge bearing surface 101 between the rearward and forward retaining lip surfaces 105, 107 of the mounting recess 101. Tool 11 is then disengaged from the bushing 10 by sliding the mounting recess 103 downwardly from the shouldered ends 18 of the shank segments 16.

The assembled position of bushing 10 shown in FIG. 5 is a permanently locked position because the bottom surfaces 64 of grip block segments 20 bear directly against the cammed projections 36, 38 forcing same in an unretractable position against the edge surfaces of the aperture 13 in support panel 15. Additionally, grip block segments 20 are maintained in a proper centered position within shank segments 16 by the locking ribs 52 in the shank segment mating with the locking rib recesses 70 in the grip block segments 20. The edges of the locking ribs 52 acting against the ends of the locking recesses 70 in conjunction with the wedging action between the grip block segments 20 from being pulled out of the bottom end of the shank segments 16. The grip block segments 20 are prevented from being displaced out of the top end of the shank segments 16 by the exterior, especially configured shouldered portions 68 of the grip block segments 20 being lockingly engaged in the tapering recesses 44 of the shank segment 16. With the grip block segments 20 thus immovably secured within the shank segments 16, the frictional engagement between the grip block segment 20 and the electrical conductor 19 occurs along that length of the grip block segments defined by the spacing of the finger protrusions 74 which may be varied to suit particular applications. Importantly the position of the finger protrusions in the assembled position of the strain-relief bushing 10 extends from a point within the panel to a point beyond the panel to thus provide a greater frictional bearing area than heretofore possible in prior art devices.

As thus described the strain-relief bushing can be applied to either a round aperture 13 or a flat sided aperture 13 in a support panel 15 (FIG. 8). When applied to the flat sided aperture 13' the flat vertical surfaces 25 of the cylindrical bottom surface 24 of the shank segments abut against the flat sides 120 in aperture 13' to prevent rotation of the bushing therein. Importantly in both apertures 13, 13' the diameter thereof is slightly larger than that of the cylindrical bottom surface 22 of the shank segments (nominally 0.045 in the embodiment shown) to permit the position of the grip block segments 20 therein. Thus in the assembled position of the bushing 10, the grip block segments 20 force the shank segments 16 to bear against the edge surfaces of apertures 13, 13' causing in the cylindrical bottom surfaces 24 of shank segments 16 to flair slightly outwardly in the assembled position of the bushing. This, in turn, forces the shank segments 16 to become relatively rigid in an assembled position thus resulting in a good bearing surface for the grip block segments 20 which, in turn, establishes good frictional engagement with the electrical conductor 19.

The invention has been described with reference to a preferred embodiment. Obviously modifications and alterations will occur to others upon reading and understanding the specifiction. It is my intention to include all such modifications and alternations insofar as they come within the scope of the present invention.

It is thus the essence of my invention to provide a molded, one-piece strain-relief bushing which employs a frangibly secured portion thereof which is axially displaced into a second portion when mounting the bushing in an aperture in a support panel.

Having thus defined my invention, I claim:

1. A one-piece, molded strain-relief bushing for holding an electric conductor fixed relative to an aperture in a support panel through which the conductor extends and adapted to be applied to and permanently locked in said aperture by means of a tool, said bushing comprising:

first and second complementary portions and a flexible web portion securing said first portion to said second portion and permitting said portions to be folded into face-to-face relationship;

each complementary portion including a grip block segment having a generally cylindrical exterior surface and a shank segment having a generally cylindrical interior surface, said grip block segment axially aligned with said shank segment and frangibly secured thereto at an end thereof;

cam means on the external surface of said shank segment to secure said shank segment within said aperture; and locking means to permanently secure (a) said shank segments within said aperture when said bushing is inserted therein, (b) said grip block segments within said shank segments when said grip block segments are telescopically received within said shank segments, and (c) said conductor within said grip block segments when said grip block segments are folded about said conductor and are telescopically received within said shank segments, said locking means including:

aligning means to assure a proper predetermined position of said grip block segments within said shank segments when said bushing is locked in said aperture by said tool;

said interior surface of each shank segment having an annular rib adjacent said end to which said grip block segment is frangibly secured, said interior surface further including a generally cylindrical portion tapering inwardly in a direction from said annular rib toward the end of said shank segment oppositely disposed from said grip block segment and said interior surface defining a recess disposed between said annular rib and said generally cylindrical portion.

2. The strain-relief bushing of claim 1 wherein said locking means further includes said exterior surface of each grip block segment includes first and second generally cylindrical surfaces disposed at opposite ends of said grip block segment and an outwardly extending shoulder disposed between said first and second generally cylindrical surfaces and adapted to mate with said recess, and said second cylindrical surface is adapted to coact with said tapered cylindrical surface of said shank segment to lock said bushing within said aperture and to lock said conductor within said bushing.

* * * * *

UNITED STATES PATENT AND TRADEMARK OFFICE
CERTIFICATE OF CORRECTION

PATENT NO. : 4,033,535

DATED : 7/5/77

INVENTOR(S) : Thomas M. Moran

It is certified that error appears in the above-identified patent and that said Letters Patent are hereby corrected as shown below:

Col. 3, line 20: "reference" is misspelled.

Col. 4, line 28: "and" should read "an".

line 62: "bottom" should be inserted before "portion".

Col. 5, line 15: "actuated" should read "unactuated".

Col. 6, line 53: The following was omitted after "20"---and the shank segments 16 prevent the grip block segments 20---.

Col. 7, line 6: "13" should read---13'---.

line 14: 0.045 should read---0.045"---.

line 29: "specification" is misspelled.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*